(12) United States Patent
Pereira et al.

(10) Patent No.: US 8,910,191 B2
(45) Date of Patent: Dec. 9, 2014

(54) ENCODER AND DECODER DRIVER DEVELOPMENT TECHNIQUES

(71) Applicant: Nvidia Corporation, Santa Clara, CA (US)

(72) Inventors: Mark Pereira, Livermore, CA (US); Srinivas Anne, Sunnyvale, CA (US); Stephen Holmes, Seattle, WA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/026,348

(22) Filed: Sep. 13, 2013

(65) Prior Publication Data

US 2014/0074484 A1 Mar. 13, 2014

Related U.S. Application Data

(60) Provisional application No. 61/700,789, filed on Sep. 13, 2012.

(51) Int. Cl.
*G06F 13/00* (2006.01)
*G10L 19/00* (2013.01)
*G06F 3/16* (2006.01)

(52) U.S. Cl.
CPC ............... *G10L 19/00* (2013.01); *G06F 3/162* (2013.01)
USPC .......................................... 719/321; 719/322

(58) Field of Classification Search
CPC ............................. G06F 9/4411; G06F 13/102
USPC .................................................. 719/321, 322
See application file for complete search history.

(56) References Cited

U.S. PATENT DOCUMENTS

| 3,173,022 A | 3/1965 | Kunsch, Jr. |
| 5,434,926 A | 7/1995 | Watanabe et al. |
| 5,815,689 A | 9/1998 | Shaw et al. |
| 5,873,354 A | 2/1999 | Krohn et al. |
| 5,875,354 A | 2/1999 | Charlton et al. |
| 5,918,073 A | 6/1999 | Hewitt |
| 6,005,901 A | 12/1999 | Linz |
| 6,226,758 B1 | 5/2001 | Gaalaas et al. |
| 6,260,011 B1 | 7/2001 | Heckerman et al. |
| 6,292,854 B1 | 9/2001 | Priem |
| 6,650,635 B1 * | 11/2003 | Weinstein et al. ............ 370/352 |
| 6,996,445 B1 | 2/2006 | Kamijo |

(Continued)

FOREIGN PATENT DOCUMENTS

| TW | 481782 | 10/2000 |
| WO | 02052240 | 7/2002 |

OTHER PUBLICATIONS

Analog Devices, Inc. "192 kHz Stereo Asynchronous Sample Rate Converter" AD1895—Specifications, Sep. 2002, XP002340804 Norwood, MA, USA.

(Continued)

*Primary Examiner* — Andy Ho

(57) ABSTRACT

A codec architecture including an audio wave driver and a coded topology driver. The audio wave driver is communicatively coupled to an audio engine and an analog audio codec. The coded topology driver is communicatively coupled to the audio wave driver by a set of interfaces that enables streamlined code implementation, improved operation efficiency and power savings, while allowing vendors to supply differentiating functionality outside of the basic requirements of the operating system.

18 Claims, 2 Drawing Sheets

(56) References Cited

U.S. PATENT DOCUMENTS

| | | | |
|---|---|---|---|
| 7,216,221 | B2 | 5/2007 | Bear et al. |
| 7,348,483 | B2 | 3/2008 | Puryear |
| 7,376,475 | B2 | 5/2008 | Fay et al. |
| 7,574,274 | B2 | 8/2009 | Holmes |
| 7,756,594 | B2 * | 7/2010 | Liu et al. .................. 700/94 |
| 7,983,772 | B2 | 7/2011 | Holmes |
| 8,078,302 | B2 * | 12/2011 | Berreth .................. 700/94 |
| 8,380,242 | B2 * | 2/2013 | Luo et al. .................. 455/550.1 |
| 2002/0012324 | A1 | 1/2002 | Hayward |
| 2002/0107594 | A1 | 8/2002 | Taylor et al. |
| 2004/0071132 | A1 | 4/2004 | Sundqvist et al. |
| 2004/0091088 | A1 * | 5/2004 | Weinstein et al. ......... 379/93.05 |
| 2004/0161126 | A1 | 8/2004 | Rosen et al. |
| 2004/0264714 | A1 | 12/2004 | Lu et al. |

OTHER PUBLICATIONS

Young M., "A Digital Audio Production System" Broadcasting Convention, 1995. IBC 95, International Amsterdam, NL, London, UK, IEE, UK, 1995, pp. 202-207, XP006528928 ISBN: 0-85296-644-X, the whole document.

Nvidia; Featured Technology Nvidia nForce Platform Processors; 2 pages; Feb. 15, 2004.

Nvidia; Featured Technology Audio Processing Unit (APU); 2 pages; Feb. 15, 2004.

Nvidia; Featured Technology; Nvidia SoundStorm; 2 pages; Feb. 15, 2004.

Nvidia; Featured Technology Digital Media Gateway; 2 pages, Feb. 15, 2004.

Intel: Intel 875P Chipset; 2 pages; Feb. 4, 2004.

Nvidia; Nvidia's New Motherboard Chipset; 3 pages; Feb. 15, 2004.

Nvidia; Technical Brief Nvidia nForce Platform Processing Architecture; 2001; 9 pages.

Nvidia; Technical Brief Nvidia nForce Platform Processors Audio Processing Unit; 2002; 10 pages.

Nvidia; Technical Brief Nvidia nForce2 MCP-T Digital Media Gateway; 2002; 9 pages.

* cited by examiner

ENCODER AND DECODER DRIVER DEVELOPMENT TECHNIQUES

CROSS-REFERENCE TO RELATED APPLICATIONS

This application claims the benefit of U.S. Provisional Patent Application No. 61/700,789 filed Sep. 13, 2012.

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science. One common aspect of computing systems is the device driver. Device drivers provide the interface between the software and the hardware of the computing sys.

The device drivers typically have a multi-layer architecture that receives device agnostic commands and data from user applications and/or an operating system and provides device specific electrical signals to control operation of one or more specific devices. Similarly, the device driver typically also receives device specific electrical signals from one or more specific devices and output device agnostic data and commands to user applications and/or the operating system.

Referring to FIG. 1, an audio device driver architecture, according to the conventional art, is shown. At the operating system level, a Windows port class audio driver 110 includes a WaveRT Port 120 and a Topology Port 130 of a port class driver. The WaveRT Port specifies what audio streams (e.g., format) are supported. The Topology Port deals, with the output format such as how many jacks/ports are included in the hardware, how they are coupled, status such as muted or not, if something plugged into the jack/port, and/or the like. The WaveRT Port 120 communicatively couples to a WaveRT Miniport 140 of an Adapter Driver 140, while the Topology Port 130 communicatively couples to a Topology Miniport 150 of the Adapter driver 160. The Adapter Driver 160 sends and receives applicable electric signals to and from the audio hardware 170.

The conventional audio driver architecture, as illustrated in FIG. 1, makes it difficult for hardware manufactures and software developers to independently create analog audio codec solutions. Accordingly, there is a continuing need for an improved audio driver architecture.

SUMMARY OF THE INVENTION

The present technology may best be understood by referring to the following description and accompanying drawings that are used to illustrate embodiments of the present technology directed toward encoded and decoder drive development techniques.

In one embodiment, art audio wave driver is communicatively coupled to an operating system port class driver. A codec topology driver is communicatively coupled to the operating system port class driver. A software development kit (SDK) provides for communicatively coupling the codec topology driver to the audio wave driver. The SDK also provides for exporting a audio wave driver interface from the audio wave driver to the coded topology driver for use in accessing an analog audio codec. The SDK further provides for exporting a codec topology driver interface from the coded topology driver to the audio wave driver.

In another embodiment, a codec architecture includes an operating system port class driver, an audio wave driver and a codec topology driver. The operating system port class driver including a WaveRT port and an topology port. The audio wave driver is communicatively coupled to an audio engine and an analog audio codec. The audio wave driver also includes a WaveRT miniport communicatively coupled to the WaveRT port. The codec topology driver is communicatively coupled to the audio wave driver. The codec topology driver also includes a topology miniport communicatively coupled to the topology port.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
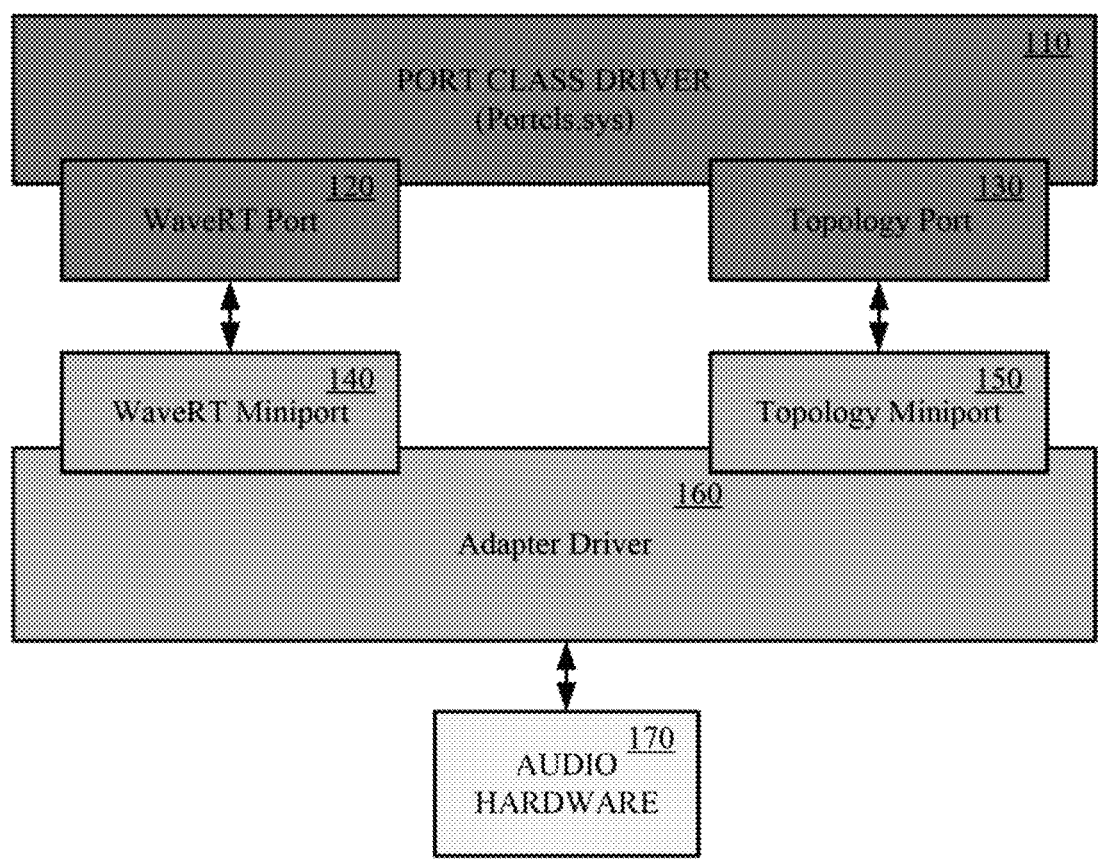
FIG. 1 shows a block diagram of an audio device driver architecture according to the conventional art.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device, that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Figure 2:
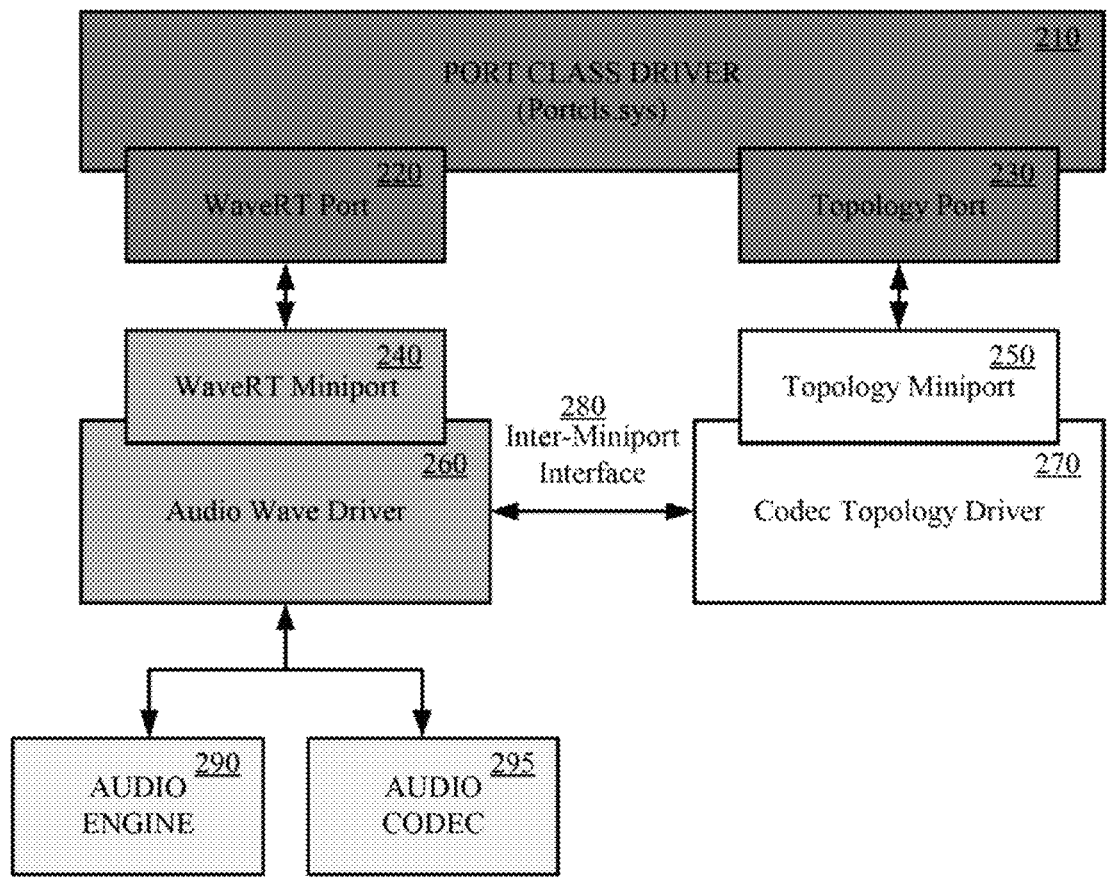
FIG. 2 shows a block diagram of an audio device driver architecture, in accordance with one embodiment of the present technology.

Referring to FIG. 2, an audio device driver architecture, in accordance with one embodiment of the present technology, is shown. The device driver may be an encoder and decoder (e.g., codec) driver, such as an audio driver. The architecture includes a operating system port class driver 210, a WaveRT port 220, a topology port 230, a WaveRT miniport 240, a codec topology miniport 250, an audio wave driver 260, and codec topology driver 270. The architecture further includes an inter-miniport interface 280 between the audio wave driver 260 and the codec topology driver 270 The device driver 210-280 operates between one or more applications and the audio hardware 290, 295. The device driver 210-280 may also operate between the operating system and the audio hardware 290, 295. The audio hardware may include an audio engine 290 and an audio codec 295.

The audio wave driver 260 implements the audio engine functionality and the codec topology driver 270 implements the controls, routing, configuration and processing of the audio paths within the codec. The inter-miniport interface 280 enables communication between the audio wave driver 260 and the coded topology driver 270. The audio wave driver 260 exports, via the miniport interface 280, the audio port topology interface data structure to the codec topology driver 270. The codec topology driver 270 utilizes the audio port topology interface to access the audio hardware 290, 295. The codec topology driver 270 exports, via the miniport interface 280, the topology miniport and codec topology driver data structures to the audio wave driver 260.

The audio wave driver 260 creates the WaveRT filter, which includes the WaveRT Port 220 and the WaveRT Miniport 240. The codec topology driver 270 creates the codec topology filter, which includes the topology port 230 and the topology Miniport 250.

The audio wave driver 260 registers the WaveRT filter 220, 240 and Topology Filter 230, 250, along with their physical connections. The audio wave driver 260 programs the audio hardware 290, 295 directly. The programming may include mapping memory ranges, mapping hooks to interrupt request (IRQs), initializing simple peripheral bus (SPB) for I2C access, initializing APB/DMA for direct memory access (DMA), initializing PEP for power and clock configuration, initializes ACPI-DSM for platform specific data, and/or the like.

The codec topology driver controls the codec hardware 290, 295 using the inter-miniport interface 280 provided by the audio wave driver. The codec topology driver 270 performs power management of the audio hardware 290, 295 based on notifications received from the audio wave drive 260.

The inter-miniport interface 280 provides access to audio engine 290, audio codec 295, and platform parameters. The inter-miniport interface 280 may be implemented by the audio wave driver 260. The codec topology driver 270 uses the interface 280 to configure the audio coded 295. In an exemplary implementation, the portion of the inter miniport interface 280 of the audio wave driver 260 may be implemented by the code in table 1.

TABLE 1

```
DECLARE_INTERFACE_(INvAudioPortTopology,IUnknown)
{
    DEFINE_ABSTRACT_UNKNOWN( )   // For IUnknown
    STDMETHOD_(ULONG,DACRead)
    ( THIS_ DWORD    RegIndex,
        USHORT      *pData
    ) PURE;
    STDMETHOD_(ULONG,DACWrite)
    ( THIS_ DWORD    RegIndex,
        USHORT      Data
    ) PURE;
    STDMETHOD_(ULONG,DACRead16)
    ( THIS_ DWORD    RegIndex,
        USHORT      *pData
    ) PURE;
    STDMETHOD_(ULONG,DACWrite16)
    ( THIS_ DWORD    RegIndex,
        USHORT      Data
    ) PURE;
    STDMETHOD_(ULONG,DSMRead)
    ( THIS_ PVOID InputBuffer,
        ULONG InputSize,
        PVOID OutputBuffer,
        ULONG OutputSize
    ) PURE;
    STDMETHOD_( ULONG,GPIOGetState)
    ( THIS_ DWORD    ControllerIndex,
        DWORD       RegIndex,
        DWORD       *pData
    ) PURE;
    STDMETHOD_(VOID,GPIORegisterCallback )
    ( THIS_ PNVGPIO_CALLBACK pfnGPIOCB,
        PVOID        pContext
    ) PURE;
    STDMETHOD_(NTSTATUS,DACOpen)
    ( THIS_
    ) PURE;
    STDMETHOD_(NTSTATUS,DACClose)
    ( THIS_
    ) PURE;
    STDMETHOD_(NTSTATUS,SetConnectionState)
    ( THIS_ TopoPins Pin,
        ULONG ConnectionState
    ) PURE;
};
```

The DACRead/DACWrite functions read to and write from the digital-to-analog converter (DAC) registers. The DSMRead function reads platform specific parameters from firmware. The GPIORegisterCallback function registers a callback TPUI line state change. The GPIOGetState function retrieves the current state of a GPIO line. The ProcessEndpointStateChange function unregisters and reregister a pin (e.g. jack detection). The SetConnectionState function sets the connection state of the pin.

In an exemplary implementation, the portion of the inter-miniport interface 280 of the coded topology driver 270 may be implemented by the code in table 2.

TABLE 2

```
DECLARE_INTERFACE_(INvAudioTopologyDevice,IUnknown)
{
  DEFINE_ABSTRACT_UNKNOWN( )
  STDMETHOD_(ULONG, Init)
  ( THIS_ PDEVICE_OBJECT pDeviceObject
  ) PURE;
  STDMETHOD_(ULONG,GetFilterCount)
  ( THIS_ PULONG pCount
  ) PURE;
  STDMETHOD_(ULONG,RegisterSubdevice)
  ( THIS_ ULONG       FilterId,
    PUNKNOWN          pUnknownAdapter,
    PUNKNOWN          *ppUnknownPortTopology,
    PUNKNOWN          *ppUnknownMiniport
  ) PURE;
  STDMETHOD_(ULONG, UnRegisterSubdevice)
  ( THIS_ ULONG FilterId
  ) PURE;
};
```

The Init function initializes the interface. The GetFilterCount function returns the number of topology filters implemented by the codec driver. The RegisterSubdevice function registers filters with the respective port class. The UnregisterSubdevice function unregisters filters with the respective port class.

In an exemplary implementation, the inter-miniport interface 280 and topology miniport 250 of the coded topology driver 270 rimy be implemented by the code in table 3.

TABLE 3

```
DECLARE_INTERFACE_(INvAudioMiniportTopology,IUnknown)
{
  DEFINE_ABSTRACT_UNKNOWN( )
  STDMETHOD_(ULONG,GetBridgePinCount)
  ( THIS_
  ) PURE;
  STDMETHOD_(TopoPins,GetPinDescription)
  ( THIS_ ULONG BridgePinId
  ) PURE;
  STDMETHOD_(ULONG,AllocatePin)
  ( THIS_ TopoPins Pin
  ) PURE;
  STDMETHOD_(ULONG,SetPinState)
  ( THIS_ TopoPins Pin,
    KSSTATE NewState
  ) PURE;
  STDMETHOD_(ULONG,FreePin)
  ( THIS_ TopoPins Pin
  ) PURE;
  STDMETHOD_(ULONG,SetGfxState)
  ( THIS_ IN BOOL bEnable
  ) PURE;
  STDMETHOD_(ULONG,GetGfxState)
  ( THIS_ OUT BOOL *pbEnable
  ) PURE;
  STDMETHOD_(ULONG,SetCodecProperty)
  ( THIS_ IN UCHAR NodeId,
    IN UCHAR Property,
    IN USHORT Value
  ) PURE;
  STDMETHOD_(VOID,SetCopyProtectFlag)
  ( THIS_ IN BOOL bFlag
  ) PURE;
  STDMETHOD_(ULONG,GetPhysicalConnectionPins)
  ( THIS_ TopoPins TopoPinDef,
    PULONG pTopoPinNun
  ) PURE;
};
```

The GetBridgePinCount function returns the number of bridge pins on a filter. The GetPinDescription function returns information to determine what type of endpoint to create. The AllocatePin function notifies the codec driver that a stream has been allocated for a given pin. The SetPinState function sets the audio state for a given pin. The FreePin function releases the resources associated with a in after a stream has been closed. The GetGfxState function returns the current state of the global effects. The SetGfxState function enables/disables the global post processing effects. The SetCopyProtectFlag function enables/disables the copy protection. The SetCodecProperty function configures the Codec sample rate, Bite rate, TX/RX offsets, Master/Slave mode, and/or the like.

The audio device driver architecture including the inter-miniport interface 280 may be implemented as a software development kit (SDK). The SDK may be embodied as computing device-executable instructions e.g., computer program) that are stored in computing device-readable media (e.g., computer memory) and executed by a computing device (e.g., processor).

Embodiments of the present technology advantageously separate the codec related code from the adapter driver thus enabling the codec vendor to provide their own codec driver which is compliant with the audio wave driver.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A system comprising:
an operating system port class driver including a WaveRT port and an topology port;
an audio wave driver communicatively coupled to an audio engine and an analog audio codec, wherein the audio wave driver includes a WaveRT miniport communicatively coupled to the WaveRT port; and
a codec topology driver communicatively coupled to the audio wave driver, wherein the codec topology driver includes a topology miniport communicatively coupled to the topology port.

2. The system according to claim 1, wherein the audio wave driver exports an interface to the codec topology driver that the codec topology driver uses to access the analog audio codec.

3. The system according to claim 1, wherein the audio wave driver creates a WaveRT filter including the WaveRT miniport and the topology miniport.

4. They system according to claim 3, wherein the audio wave driver registers the WaveRT filter, a topology filer and the physical connections of the WaveRT filter and topology filter.

5. The system according to claim 1, wherein the audio wave driver programs the analog audio codec directly.

6. The system according, to claim 5, wherein programming the analog audio codec comprises programming one or more of a group consisting of memory ranges, hooks to interrupt requests, a simple peripheral bus, APB/DMA for direct memory access, PEP for power and clock configuration, and ACPI_DSM for platform-specific data.

7. The system according to claim 1, wherein the codec topology driver exports a codec topology driver interface and a topology miniport interface to the audio wave driver.

8. The system according to claim 1, wherein the codec topology driver creates a codec topology fitter that is exported to the audio wave driver, wherein the audio wave driver registers the codec topology filter.

9. The system according to claim 1, wherein the codec topology driver performs power management of the analog audio codec.

10. One or more computing device readable media storing computing device executable instructions that when executed by one or more processing units implements a method comprising:
communicatively coupling an audio wave driver to an operating system port class driver;
communicatively coupling, a codec topology driver to the operating system port class driver;
communicatively coupling the codec topology driver to the audio wave driver;
exporting a audio wave driver interface from the audio wave driver to the coded topology driver for use in accessing an analog audio codec; and
exporting a codec topology driver interface from the coded topology driver to the audio wave driver.

11. The one or more computing device readable media storing computing device executable instructions that when executed by the one or more processing units implements the software development kit (SDK) according to claim 10, wherein the audio wave driver is communicatively coupled to the operating system port class driver through a WaveRT miniport of the audio wave driver and a WaveRT port of the operating system port class driver and wherein the audio codec topology driver is communicatively coupled to the audio wave driver through a inter-miniport interface.

12. The one or more computing device readable media storing computing device executable instructions that when executed by the one or more processing units implements the software development kit (SDK) according to claim 11, wherein the audio wave driver creates a WaveRT filter including the WaveRT miniport and the topology miniport.

13. The one or more computing device readable media storing computing device executable instructions that when executed by the one or more processing units implements the software development kit (SDK) according to claim 12, wherein the audio wave driver registers the WaveRT filter, a topology filer and the physical connections of the WaveRT filter and topology filter.

14. The one or more computing device readable media storing computing device executable instructions that when executed by the one or more processing units implements the software development kit (SDK) according to claim 12, wherein the codec topology driver exports a topology miniport interface to the audio wave driver.

15. The one or more computing device readable media storing computing device executable instructions that when executed by the one or more processing units implements the software development kit (SDK) according to claim 10, wherein the audio wave driver programs the analog audio codec directly.

16. The one or more computing device readable media storing computing device executable instructions that when executed by the one or more processing units implements the software development kit (SDK) according, to claim 15, wherein programming the analog audio codec comprises programming one or more of a group consisting of memory ranges, hooks to interrupt requests, a simple peripheral buss, APB/DMA for direct memory access, PEP for power and clock configuration, and ACPI_DSM for platform-specific data.

17. The one or more computing, device readable media storing computing, device executable instructions that when executed by the one or more processing units implements the software development kit (SDK) according to claim 10, wherein the codec topology driver performs power management of the analogy audio codec.

18. The one or more computing device readable media storing computing device executable instructions that when executed by the one or more processing units implements the software development kit (SDK) according to claim 10, wherein the codec topology driver communicatively coupled to the analog, audio codec through the audio wave driver enables differentiating functionality outside of requirements of an operating system.

* * * * *